United States Patent Office 3,096,099
Patented July 2, 1963

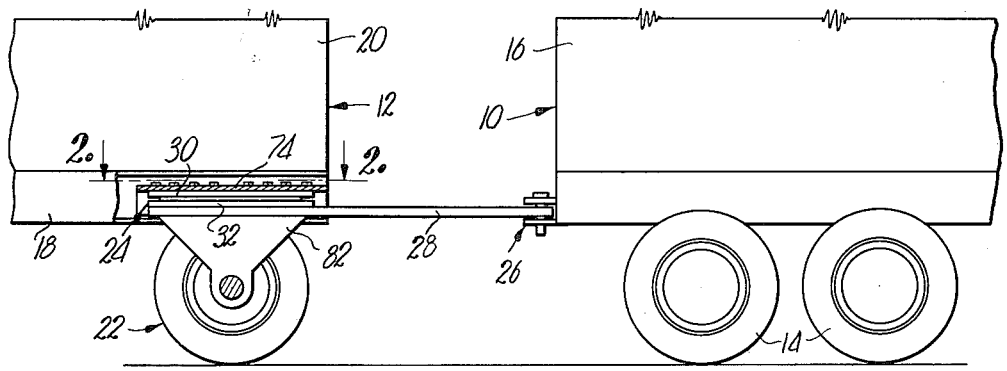
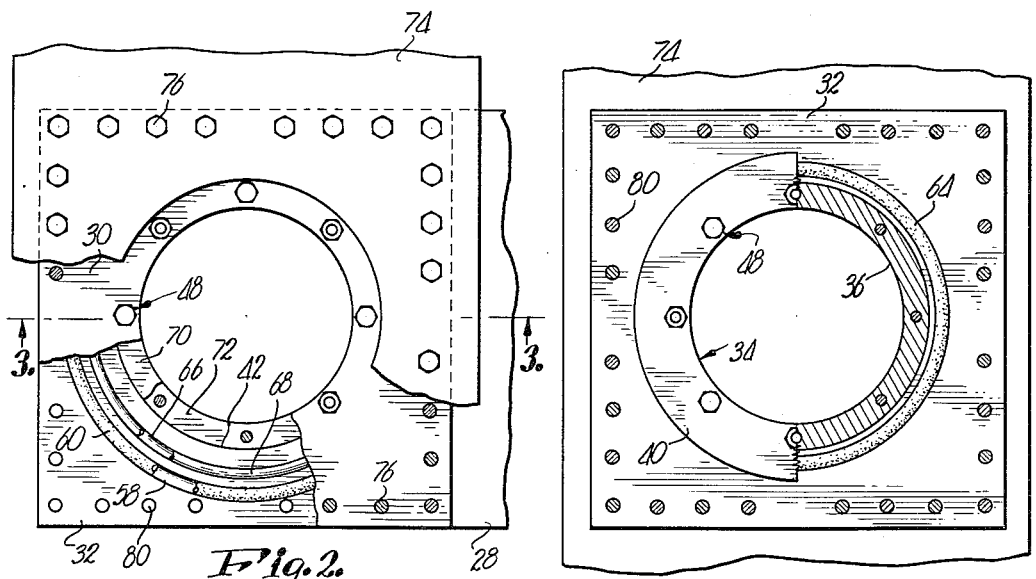
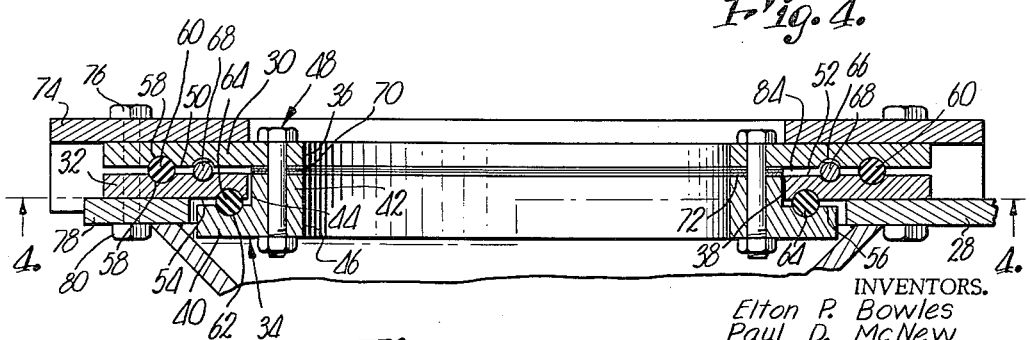

3,096,099
FIFTH WHEEL FOR TRUCK TRAILERS
Elton P. Bowles, 657 27th ½ Road, and Paul D. McNew, 147 Red Rock Road, both of Grand Junction, Colo.
Filed Jan. 22, 1962, Ser. No. 167,805
11 Claims. (Cl. 280—125)

This invention relates to a fifth wheel unit for rotatably mounting the front tow bar and wheel assembly on the frame of a trailer adapted to be pulled behind a tractor vehicle, and particularly to an improved fifth wheel especially designed for use on trailers employed to carry very heavy loads in the nature of ore and similar materials.

In certain types of mining operations it is the practice to transport the ore from the mine site to a suitable processing plant in truck trailer units which are adapted to receive relatively large loads and to transport the ore over mountainous terrain on roads which are not necessarily of the standards required for public use. One type of transport vehicle useful in the movement of ore and other very heavy loads, is a combination tractor and trailer unit wherein the tractor has a rear tandem wheel assembly supporting an open ore-receiving body and designed to pull a four or six wheel trailer therebehind, which also may carry a heavy load of ore or other material. The trailer is connected to the combination tractor and ore hauling vehicle by a tow bar which is normally coupled directly to a fifth wheel unit mounting the front wheel assembly on the trailer. The fifth wheel units on these trailers included a rotatable plate or other similar device pivotal about a centrally disposed kingpin connected either to the trailer or to the wheel and axle assembly.

Problems were encountered with kingpin fifth wheels as described because of the rapid wear of the pins under conditions of heavy use and loads and the necessity of keeping the trailers out of service for extended periods to effect repairs of the fifth wheels.

It is, therefore, the primary object of the present invention to provide a fifth wheel unit for trailers or other similar vehicles which eliminates the conventional kingpin arrangement employed in prior fifth wheels and includes novel structure having a long useful life even on trailers adapted to haul very heavy loads over rough terrain, and which may be manufactured and sold at a reasonable cost.

Another significant object of the invention is to provide a fifth wheel for vehicles as referred to above wherein is provided a pair of members adapted to be coupled to the frame of the trailer and the front wheel and axle assembly thereof respectively, including novel means rotatably interconnecting the members to provide an annular bearing surface between the members in substantial spaced relationship to the axis of rotation thereof and thereby materially reducing the wear on the components of the fifth wheel, while at the same time preventing substantial lateral relative movement between the mounting members even under conditions when the trailer is pulled over relatively rough surfaces.

A particularly important object of the invention is to provide a fifth wheel unit as described which includes novel structure for maintaining the components of the fifth wheel in a lubricated condition at all times to minimize wear on the components, while at the same time providing relatively free rotational movement of the members of the fifth wheel without excessive friction therebetween.

Another significant object of the invention is to provide a fifth wheel unit wherein the members adapted to be coupled to the frame of the trailer in the front wheel and axle assembly thereof respectively, have opposed, generally planar surfaces, means rotatably interconnecting the members, and annular resilient means interposed between the flat surfaces of the members to provide the defined annular bearing surface therebetween in substantial spaced relationship to the axis of rotation of the members, and also serving to prevent substantial lateral relative movement of the members during pulling of a trailer even when the latter is loaded down with a large quantity of ore or other similar materials.

It is a further important object of the invention to provide annular safety means between the opposed flat surfaces of the mounting members to prevent interengagement of such surfaces during use of the trailer if the annular resilient means interposed between the flat surfaces should collapse for any reason whatsoever. Another safety feature of the present fifth wheel unit and comprising an important aim of the invention is to provide means for precluding substantial relative lateral movement of the mounting members if the annular resilient means described above should collapse as mentioned.

Other important objects of the invention include the provision of a fifth wheel unit which may be manufactured of sheet steel, thereby minimizing the machining operations required in the construction of the fifth wheel; the provision of a fifth wheel unit which may be rapidly disassembled for replacement or repair of the components thereof, thereby minimizing the down time of the trailer for maintenance purposes; to the provision of a fifth wheel unit wherein is included novel adjustable means for varying the distance between the mounting members to compensate for changes in the inherent resiliency of the annular resilient means interposed between the mounting members; and to the provision of a fifth wheel unit which not only may be used on trailers adapted to carry ore and other similar materials, but also is adapted for use on various pieces of equipment which involve the movement of heavy loads, but do not require a releasable fifth wheel for coupling the tractor to the trailer.

In the drawing:

FIGURE 1 is a schematic representation of a tractor and trailer unit and showing the way in which the fifth wheel of the present invention is secured to the frame of the trailer and the front wheel and axle assembly thereof respectively, with certain portions of the trailer being broken away and in section to better illustrate the details of the present invention and with only one wheel of the front wheel and axle assembly being shown;

FIG. 2 is a fragmentary, enlarged, plan view of the present fifth wheel unit illustrating the mounting plate for the fifth wheel and with portions of the fifth wheel unit being broken away to better illustrate the details thereof;

FIG. 3 is a fragmentary, enlarged, vertical cross-sectional view taken substantially on line 3—3 of FIG. 2; and FIG. 4 is an enlarged, fragmentary, horizontal, sectional view taken on irregular line 4—4 of FIG. 3 and looking upwardly in the direction of the arrows.

For purposes of illustrating one important use of the present fifth wheel unit, a tractor and trailer have been illustrated in FIG. 1 of the drawing with the tractor being designated 10, while the trailer pulled therebehind is broadly numerated 12. Ore vehicles of the type on which the present fifth wheel unit is especially adapted to be used, normally employ a tractor 10 having tandem rear wheels 14 and a bed 16 designed to receive a relatively large load of ore or other heavy material. Similarly, the trailer 12 pulled behind the tractor 10 includes a frame 18 having a bed 20 thereon which will also receive a very heavy load of ore. The front wheel and axle assembly 22 is adapted to be mounted on frame 18 of trailer 12 by the fifth wheel unit 24 comprising the subject matter of the present invention and connected to the rear coupling 26 on tractor 10 by tow bar 28.

With specific reference to the fifth wheel unit 24, it is to be noted that the same includes a relatively heavy, square, upper plate member 30 and a complemental, generally square, relatively heavy lower plate member 32 which are rotatably interconnected by connector means broadly numerated 34.

Plate member 30 is provided with a central, relatively large opening 36 therein, while member 32 has a somewhat larger, centrally disposed aperture 38 which is coaxial with opening 36 when plate members 30 and 32 are in aligned relationship. Connector means 34 includes a generally planar, annular flange portion 40 underlying the inner segment of plate 32 defining the margin of the aperture 38 therein, as well as a generally cylindrical element 42 integral with flange portion 40 and extending into aperture 38 in substantially complemental relationship thereto. It is to be noted that the outer cylindrical surface 44 is preferably in slightly spaced relationship from the margin of plate member 32 defining aperture 38, whereas the inner cylindrical surface 46 of element 42 is aligned with the inner edge of plate member 30 defining opening 36. A series of bolt and nut couplers 48 extend through the inner segment of plate member 30 surrounding opening 36, and also through the cylindrical element 42 of connector means 34 for coupling the latter to plate member 30 and with the inner segment of plate member 32 interposed between plate member 30 and flange portion 40 of connector means 34.

As is best evident from FIG. 3, the plate member 30 has a generally planar, downwardly facing surface 50, and the plate member 32 has a generally planar, upwardly facing surface 52 in direct aligned opposition to surface 50. Similarly, plate member 32 has a generally planar, downwardly disposed face 54 in direct opposition to a generally planar, upwardly disposed face 56 surrounding element 42.

The surfaces 50 and 52 of plate members 30 and 32 respectively, are provided with annular, transversely semicircular grooves 58 therein which are vertically aligned and adapted to complementally receive semicircular portions of a first resilient O-ring 60 of a diameter to maintain surfaces 50 and 52 in predetermined spaced relationship while complementally being received in corresponding opposed grooves 58 in surfaces 50 and 52. Likewise, the faces 54 and 56 have annular, semicircular grooves 62 therein positioned in direct opposition and adapted to receive a second resilient O-ring 64 of a diameter to also maintain the faces 54 and 56 in spaced relationship a distance approximately equal to the distance between surfaces 50 and 52. Viewing FIG. 3, it can be ascertained that the O-ring 60 is diposed in greater spaced relationship from the axis of rotation of the members 30 and 32 than the O-ring 64 which is located in proximal relationship to the cylindrical element 42.

The surfaces 50 and 52 of members 30 and 32 are also provided with opposed, annular, semicircular grooves 66 therein which are of a size substantially equal to that of grooves 58 but located between O-ring 60 and element 42 of connector means 34. A safety ring 68 of circular cross-sectional configuration and of a diameter less than that of O-ring 60, is positioned in aligned grooves 66 and fitting loosely therein as illustrated. The diameter of safety ring 68 is preferably of brass or other equivalent metal and is of a diameter to prevent interengagement of surfaces 50 and 52 if the O-ring 60 should collapse for any reason.

To permit adjustment of the pressure on O-rings 60 and 64, and to compensate for flattening of the same during use, a number of removable annular shims 70 are positioned between surface 50 of plate member 30 and the upper annular margin 72 of element 42.

The upper plate member 30 is adapted to be rigidly secured to a mounting plate 74 forming a part of frame 18 on trailer 12 with a number of studs 76 being passed through plate 74 and threaded into the corners of plate member 32 to firmly affix the latter to frame 18. Similarly, the mounting plate 78 of wheel and axle assembly 22 is connected to plate member 32 by a series of studs 80 extending through plate 78 and threaded into the corners of plate member 32 as illustrated in FIGS. 2 and 3. The tow bar 28 is coupled to plate 78 and to the undercarriage 82 and wheel and axle assembly 22.

The O-rings 60 and 64 cooperate with the surfaces 50 and 52 as well as faces 54 and 56, the shims 70 and the surface 44 of connector means 34 to define an annular chamber 84 which is adapted to receive a quantity of lubricant normally comprising an admixture of grease and graphite to assure proper lubrication of O-rings 60 and 64. It is to be noted that the O-rings 60 and 64 are constructed of special resilient material to withstand very high pressures without collapsing, and to also be resistant to the lubricant placed in chamber 84. Thus, it has been determined that a neoprene O-ring having a durometer hardness reading of from 80 to 85 gives the required results. An alternative construction involves the utilization of an O-ring having an inner core of hard rubber and an outer neoprene covering of approximately 1/8 inch thickness if the O-ring has a cross-sectional diameter of about one inch. Under these same conditions, the brass ring 68 should have an effective cross-sectional diameter of about three-quarters inch.

In operation, the unit 24 is bolted to the plate 74 by studs 76 and to the plate 78 by studs 80 to thereby mount the wheel and axle assembly 22 on frame 18. During towing of the trailer 12 behind tractor 10, the wheel and axle assembly 22 is rotated relative to frame 18, thereby effecting movement of plate member 32 with respect to plate member 30. During such relative rotational movement the O-rings 60 and 64 act as annular bearing supports for plate members 30 and 32, and also prevent lateral movement of plate member 32 with respect to plate member 30.

The lubricant contained in chamber 84 effectively lubricates the O-rings 60 and 64 thereby minimizing friction between the rotatable components and preventing wear of any of the metal parts of the fifth wheel unit. It can now be appreciated that the provision of the large O-rings 60 and 64 eliminates the necessity of utilizing a kingpin as in prior fifth wheel units, and furthermore, precludes the necessity of frequently lubricating the fifth wheel and particularly those areas thereof in metal to metal contact.

After an extended period of time, if the O-rings 60 and 64 lose some of their resiliency and thereby tend to flatten to a limited extent, the bolt and nut couplers 48 may be removed to permit the operator to take one of the shims 70 off the stack thereof between element 42 and surface 50 of plate member 30 so that upon reassembly of the unit 24, the plate member surfaces 50 and 52 will be in somewhat closer relationship and again providing proper pressure on the O-rings 60 and 64. It should also be pointed out that the couplers 48 permit adjustment of the pressure on O-rings 60 and 64 so that lateral relative movement of plate members 30 and 32 is prevented, and also precluding escape of lubricant from the chamber 84.

The element 42 extending into aperture 38, serves as a safety means to prevent excessive lateral movement of plate member 32 relative to plate member 30 if the O-rings 60 and 64 should fail. The brass ring 68 also serves as a safety device to preclude interengagement of the surfaces 50 and 52 upon collapse of O-ring 60 and which could result in locking of the plate members 30 and 32 so that the trailer 12 could overturn. The provision of opening 36 in plate member 30, and the central passage through connector means 34, lowers the effetcive weight of the unit 24 without sacrifice of the inherent strength thereof.

Although not illustrated in the drawing, it is to be understood that one or more grease fittings may be provided on either of the plate members 30 and 32 and extending therethrough into the chamber 84 to permit lubricant to be introduced into chamber 84 without the necesstiy of disassembling the entire unit 24.

Having thus described the invention, what is claimed as new and desired to be secured by Letters Patent is:

1. A fifth wheel unit for rotatably mounting a tow bar and wheel assembly on the frame of a trailer, said unit including:
   (a) a first member adapted to be secured to said frame and having a downwardly facing, generally planar surface;
   (b) a second member adapted to be coupled to the assembly and having an upwardly facing, generally planar surface;
   (c) means rotatably interconnecting the members with said surfaces thereof in facing, substantially aligned relationship, said surfaces being provided with opposed, aligned, circular grooves therein in concentric relationship to the axis of rotation of the members and located in substantial spaced relationship to said axis; and
   (d) a continuous, resilient, annular load bearing element of uniform cross-sectional configuration conforming to said grooves and interposed between said surfaces, positioned in said grooves, maintaining said surfaces of the members in spaced relationship and preventing lateral movement of one of the members relative to the other member.

2. A unit as set forth in claim 1, wherein each of the grooves is of semicircular cross-sectional configuration and the annular element is an O-ring of a diameter to normally prevent interengagement of the surfaces of said members and to be complementally received in said grooves.

3. A unit as set forth in claim 2, wherein said means rotatably interconnecting the members includes means biasing the members toward each other with sufficient force to place the O-ring under predetermined compression.

4. A unit as set forth in claim 3, wherein is provided annular, substantially non-resilient safety means between the members for preventing said surfaces thereof moving into interengaging relationship upon collapse of said O-ring.

5. A unit as set forth in claim 4, wherein said safety means comprises a component positioned in concentric relationship to the axis of rotation of the members and of less effective thickness than the O-ring under normal compression thereof.

6. A unit as set forth in claim 5, wherein said surfaces of the members are provided with opposed, aligned, circular grooves therein complementally receiving said component.

7. A unit as set forth in claim 5, wherein said component is of corrosion-resistant metallic material.

8. A unit as set forth in claim 1, wherein is provided means between said axis of rotation of the members and said resilient means for cooperating with the latter and said surfaces to present an annular chamber between the members receiving a lubricant therein.

9. A fifth wheel unit for rotatably mounting a tow bar and wheel assembly on the frame of a trailer, said unit including:
   (a) a member adapted to be secured to said frame and having a downwardly facing, generally planar surface;
   (b) a member adapted to be coupled to the assembly and having an upwardly facing, generally planar surface, one of the members being provided with a relatively large, centrally disposed, circular aperture in said surface thereof, said surfaces being provided with opposed, aligned, circular grooves therein in concentric relationship to the axis of said aperture;
   (c) connector means secured to the other of said members and provided with generally cylindrical elements thereon extending into said aperture, and positioned in complemental relationship thereto; and
   (d) a continuous annular, resilient load bearing element of uniform cross-sectional configuration conforming to said grooves, interposed between said surfaces, positioned in said grooves, maintaining said surfaces in spaced relationship and providing a resilient bearing support therebetween throughout an annular area in concentric surrounding relationship to said element and spaced a substantial distance from the axis of rotation of the members.

10. A unit as set forth in claim 9, wherein said connector means and said one member are provided with opposed, generally planar, aligned faces, there being an annular continuous resilient second element interposed between said faces providing a resilient bearing support therebetween throughout an annular second area in concentric surrounding relationship to said first mentioned element and also spaced a substantial distance from the axis of rotation of the members.

11. A unit as set forth in claim 10, wherein said surfaces and the faces are provided with opposed, aligned, circular grooves therein, said resilient elements each comprising an O-ring positioned in respective opposed grooves and maintaining said surfaces and the faces in predetermined relative spaced relationship.

References Cited in the file of this patent

UNITED STATES PATENTS

| | | |
|---|---|---|
| 1,485,799 | Miner | Mar. 4, 1924 |
| 2,468,419 | Weber | Apr. 26, 1949 |
| 3,011,798 | Gates | Dec. 5, 1961 |
| 3,022,127 | Vollmer | Feb. 20, 1962 |

FOREIGN PATENTS

| | | |
|---|---|---|
| 456,862 | Great Britain | Nov. 17, 1936 |